M. F. FIELD.
WARP DRAWING MACHINE.
APPLICATION FILED MAY 11, 1898.

1,171,388.

Patented Feb. 8, 1916.
6 SHEETS—SHEET 6.

Witnesses:
Arthur F. Randall
H. B. Davis

Inventor:
M. F. Field,
By Crossley and Goddard,
Attys.

UNITED STATES PATENT OFFICE.

MILLARD F. FIELD, OF BOSTON, MASSACHUSETTS.

WARP-DRAWING MACHINE.

1,171,388.  Specification of Letters Patent.  Patented Feb. 8, 1916.

Application filed May 11, 1898. Serial No. 680,335.

*To all whom it may concern:*

Be it known that I, MILLARD F. FIELD, of Boston, in the county of Suffolk and State of Massachusetts, have invented certain new and useful Improvements in Warp-Drawing Machines, of which the following is a description sufficiently full, clear, and exact to enable those skilled in the art to which it appertains or with which it is most nearly connected to make and use the same.

This invention relates to warp-drawing machines or devices constructed more particularly for the purpose of controlling the members of a series of independent detached heddles, or other thread-engaging loom elements, and also the mechanism for drawing warp threads into the eyes or openings of such detached loom elements, although in many respects the invention is applicable to purposes other than those referred to and other than the particular one with reference to which the invention is herein illustrated.

I have heretofore invented and had patented by me, under Patent No. 600,670, dated March 15, 1898, a machine of the kind and for the purpose mentioned; but the said machine was not shown to be so organized as to best adapt it to operate upon "metallic heddles," so called, which consist, as they are herein considered, of thin strips of steel or other similar material arranged upon or suspended from a horizontal bar in planes parallel with the line of extension of the warps, the eyes for the reception of the warp-threads being formed transversely through the heddles, or on a line at right angles to the line of extension of the warps. Metallic heddles of this kind, by reason of their peculiar construction and arrangement, as compared with heddles formed from fibrous cords, are not so readily controlled by mechanical means as are the last-mentioned heddles, and hence the impossibility, so far as I am now able to see, of making one machine to answer to good advantage for both purposes—that is to say, for action upon both kinds of heddles.

It is the purpose in the present invention to so organize and perfect a machine that it will be capable of selecting, separating, disengaging or releasing singly, successively, and with certainty, the detached or independent metallic heddles in the desired order, drawing each heddle aside as it is selected or disengaged, partially turning it, and presenting its eye with exactness to the drawing-in hook, and then allowing the said heddle to be passed along out of the way; and then taking, selecting or separating and acting upon the next heddle in order, and so on throughout the width of the series of heddles constituting the harness, doing all of the work automatically and with precision.

By detached or independent heddles herein referred to is meant such as are customarily used in well-known forms of metallic harnesses or drop-bar structures for warp-stop-motions, and in which there is no interconnecting structure as in so-called woven harnesses.

To the foregoing ends my invention consists of a warp-drawing machine embodying in its construction a metallic heddle selector or separator, which may be a magnet or any efficient mechanical device, capable of selecting or catching a desired or particular heddle from the mass or collection of heddles and separating it so that it may be taken by a gripper, fingers, or other turning device and be thereby partially turned or placed in such position that the automatically reciprocated hook may pass through the eye, catch a warp-thread, and in returning draw it in; the grippers or fingers subsequently releasing the heddle, and again, with the selector or separator repeat their operations upon other heddles.

I propose in the invention, as hereinbefore stated, to embrace the selector or separator and gripper in one device or tool—that is to say, make one device perform both offices or functions of separating and turning—or employ a separate device or tool for each function or result.

My invention also consists of means and combinations of devices coöperating with those designed to carry out the prime purposes of the part of the invention so far mentioned, as will more fully appear from the detailed explanation hereinafter given, in connection with the annexed drawings.

It may, furthermore, be said that various parts of my invention or improvements may be used in other connections than that herein shown, I having in this specification merely undertaken to give a full and clear explanation to those skilled in the art, of one or more forms of construction, and a mode or modes of operation, showing instances, merely in which the invention may be constructed and colorably, though not substantially, varied.

Reference is to be had to the annexed drawings and to the letters and other characters of reference marked thereon, forming a part of this specification, similar letters, etc., indicate the same parts or features, as the case may be, wherever they occur.

Of the drawings, Figure 1 is an end elevation of the machine complete, the legs or lower supporting frame-work being shown as broken away. Fig. 1ª is a detail view of part of the means for collecting or aggregating the heddles for convenient action thereon by the separator or selector and gripper, as will presently more fully appear herein. Fig. 2 is a transverse vertical sectional view of the machine, substantially on line 2—2, Fig. 3, looking in the same direction as in Fig. 1, but more clearly showing the construction and mode of operation of some parts, by reason of the removal of other parts. Figs. 14 to 16, inclusive, show an efficient form of gripper in different positions. Fig. 16ª shows a construction in which the selector or separator and gripper may be combined in one device. I have throughout considered the gripper and turning means as comprehended under one name.

In the detailed description following, it will be considered sufficient to a clear understanding of the invention, in view of the prior state of the art, to merely make reference by name to such parts of the machine embodying my present invention as may not have been wrought upon or substantially changed in the making of the said invention.

In the drawings, $a$ designates the frame of the machine provided with the tracks $b$ $b$ upon which the carriage $c$ is adapted to travel.

$d$ is the cam shaft and also the main operating shaft. It is adapted to be operated by hand or to be driven through the medium of a belt from a tin drum or cylinder (not shown).

Figures 1, 1A:
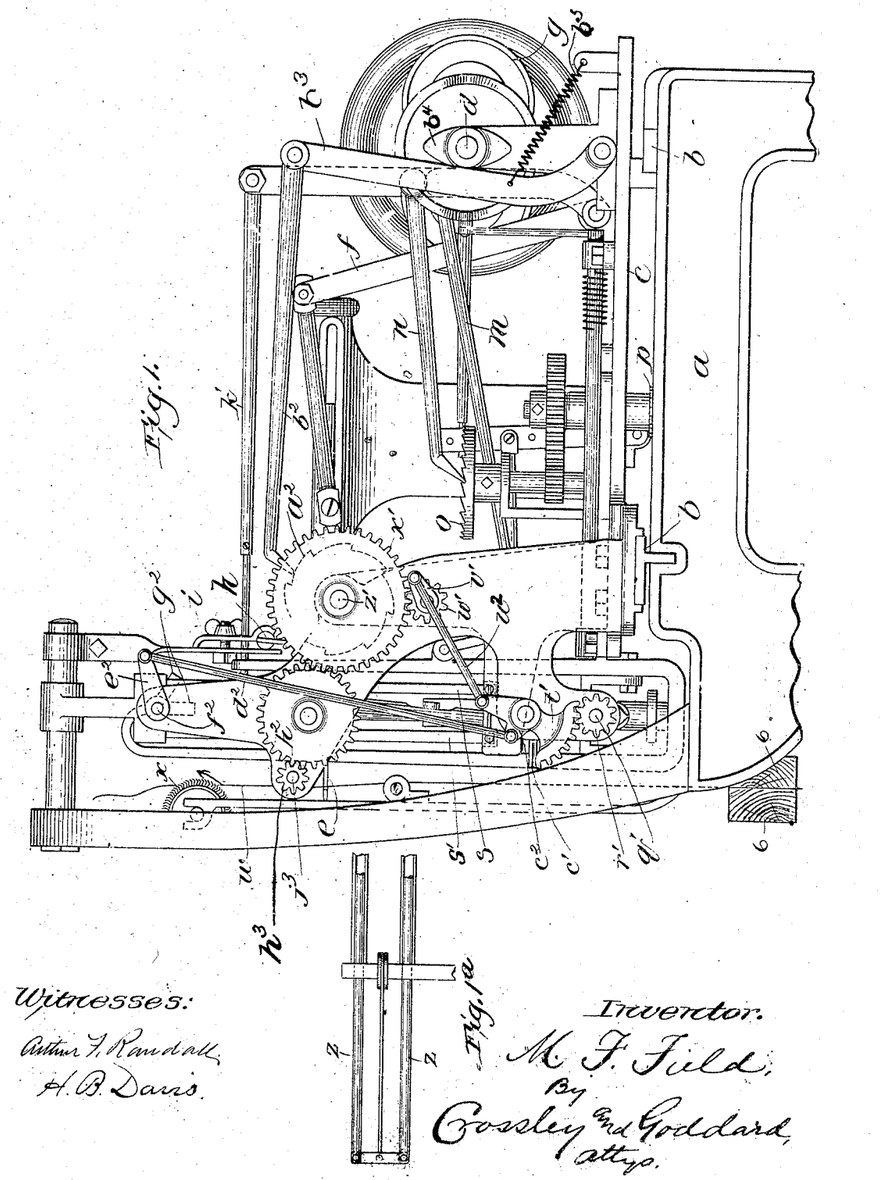

$e$ is the drawing-in hook or needle adapted to be reciprocated in suitable bearings, as is clearly shown in Figs. 1 and 2, by a pivoted lever $f$ operated upon by a double cam $g$ on the cam shaft.

$h$ is the reed held in loose or slightly yielding supports $i$.

$j$ is the reed-opener lever secured on the rock-rod $k$ and operated in one direction by the spring $l$ (Fig. 3), surrounding the said rod and in the other direction by a collar $m^2$ on the push-rod $m$, the latter being actuated by a cam on the cam shaft $d$.

$j^{22}$ is a spring, bearing lightly against the reed to hold it frictionally in place.

$n$ is a rod actuated at its outer end by a cam on the said cam shaft and constructed at its inner end as a pawl adapted to operate a ratchet wheel $o$, which, through the medium of suitable gearing, operates the pinion $p$ which engages the rack-bar $q$ and moves the carriage step by step to a greater or less extent at each movement, as may be required, along the frame or bed of the machine.

$r$ is a thread knock-off or needle-stripper (Fig. 3), adapted to act on the warp-thread drawn in by the needle and strip it from the needle hook; the said stripper being actuated through suitable means from a cam on the said cam shaft.

$s$ $s'$ are the metallic heddles which, as herein shown and as most commonly constructed, consist of thin strips of steel having slots $t$ formed through their upper ends by means of which feature the heddles are strung upon their respective supporting bars $u$ $u'$. The said slots $t$ are elongated to assist in the performance of functions with which this invention is not specially concerned, and hence it is not essential to the present improvements that the slots should be elongated, and, for that matter, the heddles might be connected at their lower ends with bars similar to those marked $u$ $u'$ instead of employing the guideways $y$ $y'$, or such guideways may be employed in place of the bars. $v$ designates the eye for the warp, formed in the metallic heddle, in a direction at a right angle to that in which the warps extend which pass through the said eyes.

$w$ designates the warp-threads which extend up from a warp-beam (not shown) between tightly-holding clamp-bars 6—6 or their equivalent, over the screw-shaft $j^3$ to a holding and tension roll $x$ (see Figs. 1, 2 and 3) into or upon which the ends of the warp-threads are laid. A pair of clamping bars similar to bars 6—6 may be used in place of the roll $x$. Between the warp-beam or the tightly-holding clamping-bars (for the latter are not essential) and the holding and tension roll $x$ or other clamp device, the warp-threads are acted upon by mechanism, to be presently described, to space and position them coördinately and successively with the spaced and positioned heddle-eyes and with the line of movement of the reciprocating drawing-in hook $e$.

Figure 3:
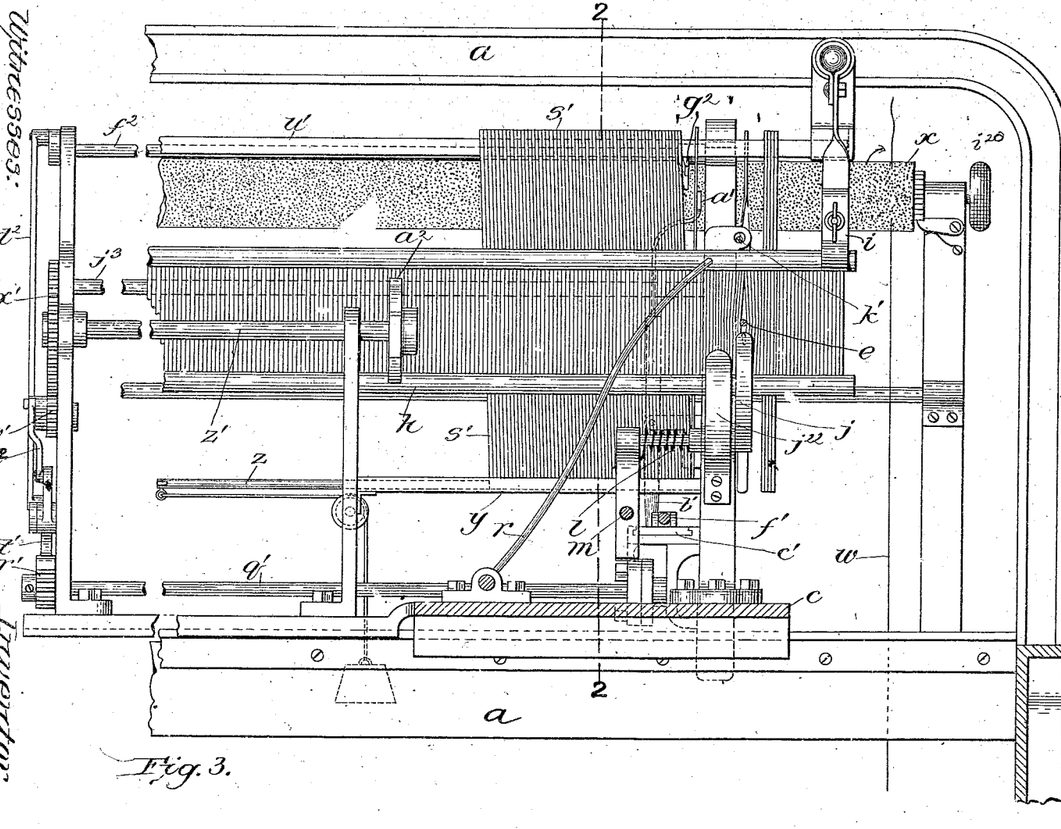
Fig. 3 is a partial longitudinal vertical section viewed from the right of Fig. 2. The section is taken on a line 3—3, Fig. 2, which is between the carriage and its equipments and the parts operated upon by the devices on the carriage, the chief portions of which devices are removed.

The heddles $s\ s'$ in their normal condition hang loosely from their supporting bars $u\ u'$, and with their width in planes substantially parallel with the line of movement of the drawing-in needle. The first act or step, therefore, in the operation of spacing and positioning the heddle-eyes, constructed as herein shown, is to collect or arrange the heddles so that they can be taken hold of in regular order, and this I do in the machine herein shown, by crowding them closely together on their bars; and, where they are normally left loose at their lower ends, I find it convenient to provide guideways $v\ y'$ into which the lower end of the heddles may be arranged and held against edgewise displacement. I provide each of the said guideways with a stop at its end against which the first heddle in the guideway will be brought to bear and by which it will be stopped; and, to keep the heddles crowded up against the said stop, I provide the guideway in the end portion opposite the stop with a follower $z$ (in this instance constructed as a rod), which is made to bear against the heddles and press them forward by any suitable mechanism, that herein shown being a weight connected with the follower by means of a cord passed over a pulley, as is clearly portrayed in Figs. 1ª and 3.

In selecting or separating the heddles singly and successively and gripping and partially turning and positioning them, I have employed and contemplate employing different forms of devices, as circumstances or convenience may suggest. It will, however, be unnecessary to show and describe more than is herein done in order to give a full and clear understanding of the construction, mode of operation, and scope of this feature or part of the invention.

$a'$ designates a magnet fixed on or connected with the upper end of a bar $b'$ which latter device is pivoted or fulcrumed at a point intermediate of its ends, so that its upper and lower ends may be moved back and forth and from side to side, and at its lower end extends through a V-shaped slot formed in a slide plate $c'$, guided on suitable ways, and into a nearly or quite U-shaped slot formed in a fixed plate $d'$ below the slide plate. The magnet and its support, in this case, forms a selector or separator.

It will now be seen that when the slide plate $c'$ is reciprocated, as it may be by an eccentric or cam $e^2$ on the cam shaft operating a rod $e'$ so as to move the said rod lengthwise, and through suitable connections, as shown in Fig. 2, operating in like manner a rod $f'$ connected to the slide plate, the magnet will be moved up, say, first against the outer one of the series of heddles $s$, then moved back, drawing with it the heddle with which it was brought into contact, the friction between the heddles and their supporting bar serving to hold back the other heddles, then will be moved over to the line of heddles $s'$ and up against the outer heddle of that series and then back, thus separating the first heddle in that series from the others and draw it back, and the same operation will be repeated throughout the two series of heddles. In Figs. 10 to 13, inclusive, it is shown how the lower end of the bar $b'$ is operated upon to cause it to perform the successive steps herein just described.

Figures 5, 8, 9:
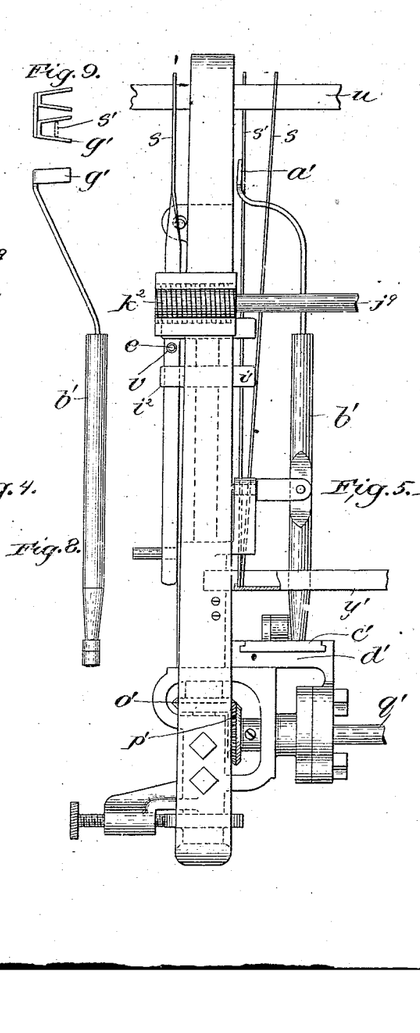
Fig. 5 is a view, looking from right to left of the parts shown in Fig 4.
Fig. 8 is a side view of a modified form of a selector or separator for selecting or separating and moving away or apart from the mass of undrawn heddles the particular heddle to be positioned and drawn.
Fig. 9 is a plan view showing the form of the upper part of the selector shown in Fig. 8.
Figure 17:
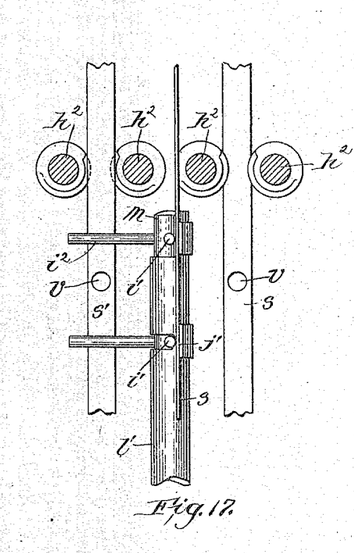
Fig. 17 is an end view, Fig. 18 front or side view, and Fig. 19 a plan view of a modified form of selector or separating means, adapted to select and separate the heddles one by one and successively, so that the gripper may taken them, partially turn them and deliver them.
Figure 18:
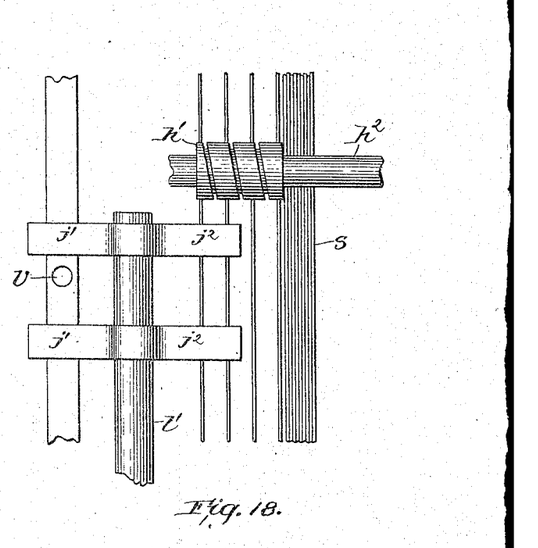
Figure 19:
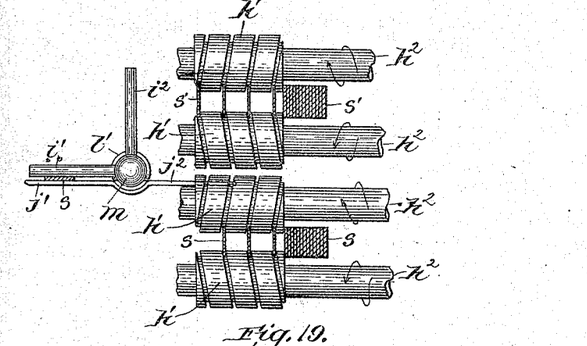

Instead of employing a magnet on the bar $b'$ as described, I may use a mechanical device such as is shown in Figs. 8 and 9, and which consists of a selector or separator $g'$ having inclined resilient sides adapted to pass on the opposite sides of the heddle, and wedge the latter between the said resilient sides sufficiently firm to enable it to be held and drawn away from the others, as hereinbefore described with respect to the magnet. In this case it is only necessary that the inclined sides should be maintained in place resiliently, it being understood that this may be accomplished in various ways. I have shown the last mentioned form of heddle selector as being made double so that one can act upon one line of heddles and the other upon another, but this is an expedient not necessary of adoption, since one resilient pair of jaws $g'$ may serve to act upon the heddles on both bars $u\ u'$. Again, I may employ screws or worms $h'$, as shown in Figs. 17, 18 and 19, constructed and arranged preferably in pairs to engage the heddles by their edges, and select and separate them singly as the lips of the screws $h'$ come into contact with them at each revolution of the screws. In Fig. 19 of the said drawings, the arrows around the screw-shafts $h^2$ indicate the direction of revolution of the screws. This form of selector or separator has been found efficient and desirable for most cases.

Figures 4, 7:
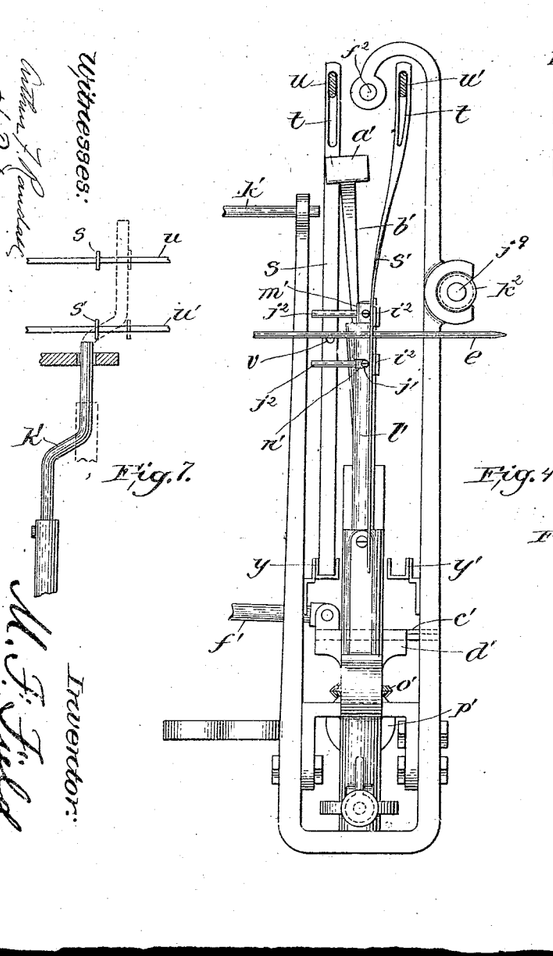
Fig. 4 is an end view of the heddles, the selector or separator, the gripper, their supporting and immediately connected and coöperating mechanism.
Fig. 7 is a detail view of a form of means for moving away the warp-threaded heddles after they have been freed from the gripper.

When by means of the devices and mechanism just described, a heddle has been selected and separated from the mass hanging in a harness and placed in proper position, it is taken hold of and operated upon by the mechanism which I have designated a "gripper" which is illustrated in its relative position in the machine in Figs. 2, 4 and 5, and in detail in Figs. 6, 14, 15, 16, 16ª.

Figure 6:
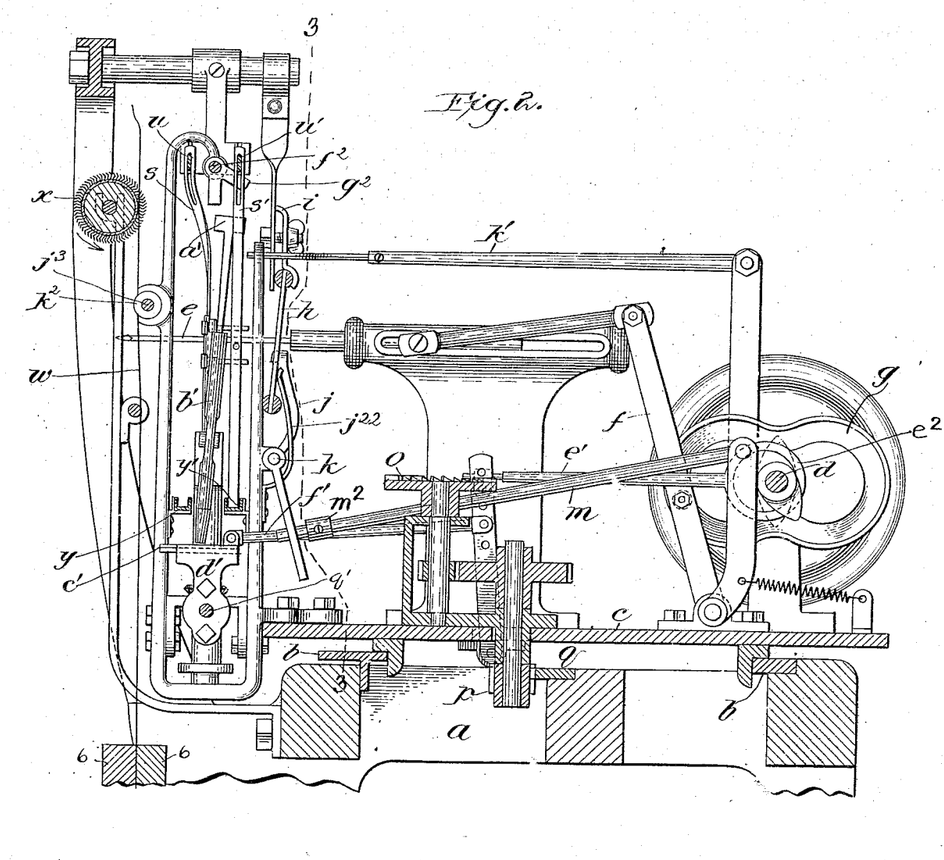
Fig. 6 is a vertical longitudinal sectional view of one form of gripper and its immediately connected and actuating mechanism.
Figure 10:
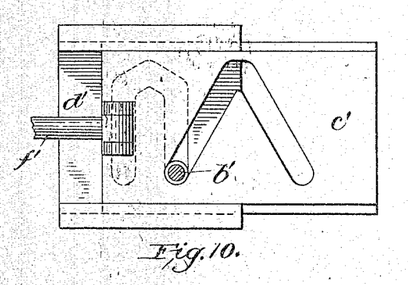
Figs. 10 to 13, inclusive, show the means for operating the shaft of the selector or separator in different positions.
Figure 11:
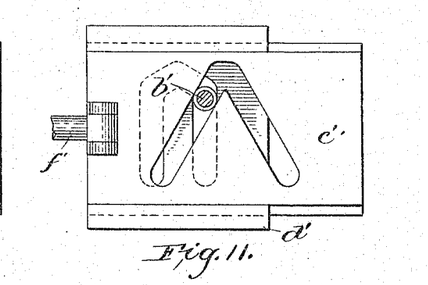
Figure 12:
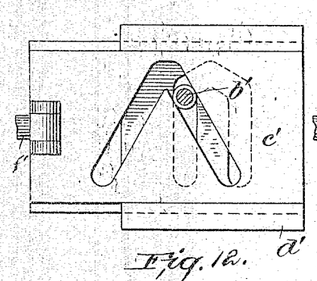
Figure 13:
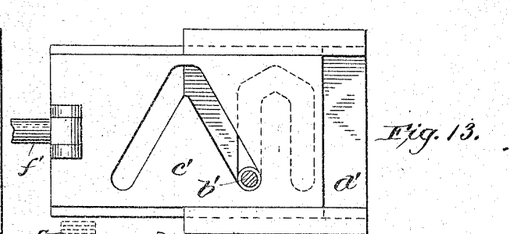

This gripping mechanism consists of a shaft $m'$ stepped in the frame of the machine, as seen in Fig. 6, around which shaft is a sleeve $l'$, provided with a miter gear $o'$ by which the sleeve is turned. Near the top of the shaft $m'$ there is secured a pair of arms $j'$, $j^2$ which project radially therefrom at about a right angle with one another, and each of which constitutes one jaw of the gripper. Another pair of arms $i'$, $i^2$, which constitute the other jaws of the gripper, are secured to the sleeve $l'$ and project substantially diametrically therefrom, and in the same horizontal plane with the arms $j'$, $j^2$, which latter project through a circumferential slot $n'$ of about 180°, in the sleeve $l'$, Fig. 4. The sleeve $l'$ is given a reciprocating rotary movement around the shaft $m'$, by means of its gear $o'$, which meshes with a corresponding gear $p'$ upon the end of a shaft $q'$, Fig. 5, which has upon its opposite end a pinion $r'$, engaged by a toothed segment $t'$, which is caused to oscillate by its connection through a pitman $u^2$ with a crank $v'$, secured to a small gear $w'$ which meshes with a large gear $x'$ upon the shaft $z'$, (see Fig. 1). There is also secured upon the shaft $z'$ a ratchet wheel $a^2$ which is engaged by a pawl rod $b^2$, pivoted to a lever $b^3$, which lever is thrust forward by the double cam $b^4$ on the shaft $d$; thereby turning the ratchet $a^2$, gear $x'$ and all connected mechanism, intermittently as the cam $b^4$ rotates. A spring $b^5$ holds the lever $b^3$ constantly in contact with said cam $b^4$. By means of an intermediate idler gear $h^2$ which meshes with the gear $x'$ and a pinion $h^3$ on the end of the shaft $j^3$, that shaft and the warp-separating screw upon its opposite end are also intermittently turned by the operation of the ratchet $a^2$. From the same source also an oscillating motion is given to a pair of heddle holding fingers $g^2$ upon a shaft $f^2$, through its connection with the segment $t'$, by means of a short arm $c^2$, pitman $d^2$, and crank $e^2$. The fingers $g^2$ have a beveled face so that as they swing back and forth they will crowd between the heddle last selected and the next succeeding one and hold it back with the mass of heddles beyond, while the warp-thread is drawn through the eye of the selected heddle, (see Figs. 1 and 3). All this mechanism is supported upon and moves with the carriage $c$.

Figure 14:
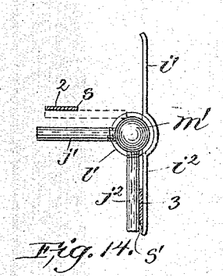

The operation of the gripping and heddle-turning devices is as follows:—Assuming that a heddle has been selected and separated from the mass hanging in a harness, by the operation of the separator $g'$, and placed in the position shown at 2, Fig. 14, within range of the gripper jaws; the arm $i'$ will then be turned around by the sleeve $l'$ from the position shown in Fig. 14 to that shown in Fig. 15, thereby gripping the heddle $s$ between the two jaws $i'$, $j'$. As the sleeve $l'$ continues to revolve it carries the two jaws of the gripper with the heddle between them around to the position shown in Fig. 16; thereby twisting the lower end of the thin metallic heddle about, so as to present its flat side toward the needle point and place its eye in proper position for the passage of the needle in drawing in a warp-thread. As soon as the needle has drawn a warp-thread into the eye of the heddle $s$, the action of the crank $v'$ and the segment gear $t'$ turns the sleeve $l'$ in the opposite direction and the arm $i^2$ is thereby caused to catch the heddle $s'$ which has been separated from the mass in the second harness, and press it against the arm $j^2$, and as the sleeve $l'$ continues to revolve the heddle $s'$ is twisted about and carried to the position shown at 3, Fig. 14, ready for the passage of the needle through its eye; and thus the operations are repeated alternately upon each heddle contained in the two harnesses.

In Fig. 19, the heddle gripper is shown in its proper position in relation to the screw heddle-separating devices $h'$, hereinbefore described.

When each heddle is released by a gripper in its reverse action, the heddle may be pushed forward out of the way of the gripper jaws by a push-rod $k'$, which is operated by a cam on the shaft $d'$—shown in side elevation in Figs. 1 and 2, and in plan in Fig. 7.

A single pair of grippers only may be employed to turn and present the heddles to the needle, but in order to hold the heddles more securely two pairs of grippers may be used to grip the heddle above and below the eye as illustrated in Figs. 4 and 6.

Figures 15, 16, 16A:
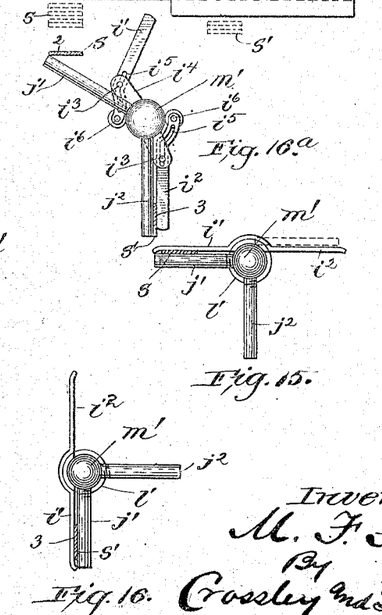

In Fig. 16ª I have shown the heddle selector or separator and gripper and turner, combined in one device. The arms or gripper jaws $j'$, $j^2$, are made magnets, and as heretofore are secured to the shaft $m'$. In this construction the sleeve $l'$ is preferably dispensed with and the miter gear $o'$ is keyed directly to the shaft $m'$. The said shaft is operated first, for example, so as to carry the magnet arm $j'$ back into contact with a heddle s, then as the shaft m' with the arm j' is turned in the opposite direction, the magnet will attract that heddle and separate it from the others. As the shaft m' continues to rotate, an arm i', which constitutes the other jaw of the gripper, and which is pivoted to a support $i^6$ attached to the frame of the machine, is caused to swing down and grip the separated heddle s between itself and the jaw j'. This latter operation is accomplished by means of a pin $i^3$ which projects from the end of an arm $i^4$ into a suitably formed slot $i^5$ in the rear portion of the arm i'. The arm $i^4$ is secured to the shaft m', and as that shaft rotates it causes the pin $i^3$ to slide along in the slot $i^5$, thereby causing the arm i' to turn upon its pivot in the stationary support, and swing down against the arm j', and as in the operation of the construction shown in Fig. 16, the continued rotation of the shaft m' with the gripper i', j', will twist the lower end of the heddle into the position shown in said Fig. 16, ready for the passage of the drawing-in needle through its eye.

As will be observed by an inspection of Fig. $16^a$, a pair of separating and gripping devices of this modified construction is provided upon the shaft m', the second one consisting of arms $i^2$, $j^2$, and connected parts similar to those connected with arms i', j', so that the grippers may operate alternately upon the heddles of two harnesses. The warps pass from the warp-beam upward against the shaft $j^3$ and separating screw $k^2$, and their ends are laid upon the tension roller x, or between clamp-bars.

The tension device x shown in Figs. 1, 2 and 3 consists of a roll covered with card clothing into which the ends of the warp-threads are laid and by which they are held; and the tension is secured by turning the said roll x by means of the hand-wheel $i^{20}$ (Fig. 3) in the direction indicated by the arrow in said figures, thus drawing the warp-threads taut and holding them in that condition by a weighted strap passed over a pulley (not shown) on the shaft of the tension roll and operating with a tendency to turn it so as to keep the threads stretched. Instead of employing the tension roll x I may, and in many cases prefer to, use clamping-bars as heretofore stated.

It will be noted that only that portion of the heddle containing the warp-eye v need be turned by the grippers; and that, in acting upon that portion, the part below the eye will also be turned, which will result in freeing the lower end of the heddle which is being acted upon from the heddle-guiding means and their stop, so that the heddle after being threaded may be pushed along in its order, as pictured in Figs. 3 and 7.

In substantially all cases I find it necessary to assemble the heddles, from their normal positions, into a substantially compact mass before acting upon them to separate them singly and successively and to turn the eye portion so that the needle may pass through the heddle-eye and catch a warp-thread and draw it in. Any arrangement of the heddles, however, that will enable them to be properly operated upon will subserve the purposes of the invention.

It will be seen that the warp-thread spacing-screw and its shaft are intermittingly rotated; the sudden starting and stopping tending better toward straightening out the warp-threads, should they be crossed or otherwise entangled, than as though the rotation of the said screw and its shaft were continuous and regular.

It is to be understood that my invention not only contemplates the drawing of warp threads through the eyes of the heddles of a metal harness and the control of such heddles, but also the drawing of threads through and the control of other like devices such, for example, as metallic drop bars, sometimes called drop heddles, for stop motions which are employed in connection with the warp of a loom.

What I claim as my invention and desire to secure by Letters Patent, is—

1. In a warp-drawing machine provided with heddles consisting of thin perforated plates, a selecting device adapted to engage said heddles singly and separate them successively from the aggregate mass suspended in the harness, substantially as described.

2. In a warp-drawing machine, means to assemble a series of perforated sheet metal heddles compactly and in orderly sequence, and a selector to engage each heddle singly and separate it from the series preparatory to presentation for the drawing-in operation.

3. In a warp-drawing machine provided with heddles consisting of thin perforated plates, a selecting device to select and separate a single heddle from the aggregate mass, and a gripper to seize the separated heddle and turn its eye to proper position for the drawing-in operation.

4. In a warp-drawing machine, means for supporting a series of perforated sheet metal heddles, a gripper to engage said heddles separately, and mechanism to operate the gripper to properly present the eye of the heddle for the drawing-in operation.

5. In a warp-drawing machine, means to assemble a series of flat flexible heddles and hold them compactly in orderly sequence, a selector to engage the heddles singly and separate them successively from the series, a gripper to grip each separated heddle and mechanism to operate the gripper and thereby control the separated heddle and properly present its eye for the drawing-in operation.

6. In a warp-drawing machine, means to support a series of flat flexible heddles and hold them in compact orderly sequence, a selector to engage the heddles singly and separate them successively from the series, a gripper to grip each separated heddle, mechanism to operate the gripper and thereby control the separated heddle and properly locate its eye for the drawing-in operation and a device to push the heddle away from the gripper when released thereby.

7. In a warp-drawing machine, means for supporting a series of perforated sheet metal heddles, a gripper to engage the heddles singly, mechanism to turn the gripper and properly present the heddle-eye for the drawing-in operation, and a device to push each heddle away from the gripper after it is released thereby.

8. In a warp-drawing machine, means for supporting a series of flat flexible heddles loosely at their upper ends, a guideway for the lower ends of said heddles, and means for holding them therein compactly and in orderly sequence.

9. In a warp-drawing machine, means for supporting a series of perforated sheet metal heddles, means for successively separating the heddles and giving a partial turn to the lower portion thereof and placing the eye in the path of movement of the drawing-in needle, and a reciprocating needle to pass through the eye and draw-in a warp-thread.

10. In a warp-drawing machine, means for supporting a plurality of series of sheet metal heddles, a selector adapted to engage and separate said heddles singly from the series, and mechanism to operate said selector to engage and separate a heddle from one or the other series, as predetermined.

11. In a warp-drawing machine, a warp-thread selecting and separating screw and a frictional tension device to hold the ends of the warp-threads and tend constantly to draw them taut around the separating screw.

12. Mechanism for controlling and feeding successively a series of detached or independent heddles for the purpose of drawing warp-threads therein, which consists of means to hold the heddles in compact orderly sequence and means to disengage them singly and successively from the series.

13. Mechanism for controlling and feeding successively a series of detached or independent heddles which consists of means to hold the heddles in compact orderly sequence, means to disengage them singly and successively from the series, and means to accurately position each disengaged heddle for the drawing-in operation.

14. Mechanism for controlling and feeding successively a series of detached or independent heddles, which consists of means to hold the heddles in compact orderly sequence, means to disengage them singly and successively from the series, means to accurately position each disengaged heddle for the drawing-in operation, and means to move each disengaged heddle to another position apart from the first series, after the warp-thread is drawn therein.

15. In combination, mechanism to hold a series of metallic heddles in compact orderly sequence, and means to disengage them singly and successively from such series.

16. In combination, mechanism to hold a series of metallic heddles in compact orderly sequence, means to disengage them singly and successively from the series, and a device to draw a warp-thread into each disengaged heddle.

17. In combination, mechanism to hold a series of metallic heddles in compact orderly sequence, means to disengage them singly and successively from the series, means to accurately place each disengaged heddle for the drawing-in operation, and a device to draw a warp-thread into each heddle so placed.

18. In combination, mechanism to hold a a series of metallic heddles in compact orderly sequence, means to disengage them singly and successively from the series, means to accurately place each disengaged heddle for the drawing-in operation, a device to draw a warp-thread into each heddle so placed, and means to move each heddle to a position apart from the first series after the warp-thread is drawn therein.

19. In a warp-drawing machine, a rod or bar to engage openings in a series of independent metallic heddles and support them in orderly sequence, means to maintain the heddles in a compact mass thereon and means to disengage them singly and successively from the mass.

20. In a warp-drawing machine, a rod or bar to engage openings in a series of independent metallic heddles and support them in orderly sequence, means to maintain the heddles in compact mass thereon, means to disengage them singly and successively from the mass, and means to accurately position each disengaged heddle upon the bar for the drawing-in operation.

21. In a wrap-drawing machine, a rod or bar to engage openings in a series of independent metallic heddles and support them in orderly sequence, means to maintain the heddles in compact mass thereon, means to disengage them singly and successively from the mass, means to accurately place each disengaged heddle upon the bar for the drawing-in operation, and means to move each heddle to a position apart from the mass after the warp-thread is drawn therein.

22. In a warp-drawing machine, a rod or bar to support a series of independent metallic heddles by engagement with openings therein, means to maintain the heddles in compact mass thereon, means to disengage them singly and successively from the mass, and a device to draw a warp-thread into each disengaged heddle.

23. In a warp-drawing machine, a rod or bar to support a series of independent metallic heddles by engagement with openings therein, means to maintain the heddles in compact mass thereon, means to disengage them singly and successively from the mass, means to accurately place each disengaged heddle upon the bar for the drawing-in operation and a device to draw a warp-thread into each heddle so placed.

24. In a warp-drawing machine, a rod or bar to support a series of independent metallic heddles by engagement with openings therein, means to maintain the heddles in compact mass thereon, means to disengage them singly and successively from the mass, means to accurately place each disengaged heddle upon the bar for the drawing-in operation, a device to draw a warp-thread into each heddle so placed, and means to move each heddle to a position apart from the mass after the warp-thread is drawn in.

25. The combination of mechanism for holding a series of detached thread-engaging loom elements, such as detached independent heddles, of means for detaching the individual members thereof from the series.

26. The combination of mechanism for holding a series of detached thread-engaging loom elements, such as detached independent heddles, of means for individually positioning the same, and means to place a thread through the positioned member.

27. The combination with mechanism for holding a series of detached thread-engaging loom elements, such as detached independent heddles, of thread-placing means and means to present said members individually in operative relation to said thread-placing means.

28. The combination with mechanism for holding a series of detached thread-engaging loom elements, such as detached independent heddles, in compact series of arrangement, of means for detaching them one by one from the series.

29. The combination with mechanism for holding a series of detached thread-engaging loom elements, such as detached independent heddles, one against another, of means for withdrawing one from the series while holding back the remaining members thereof.

30. The combination with a support for loosely holding a plurality of detached, thread-engaging loom elements, such as detached independent heddles, of means for holding them in compact series, and means for freeing the foremost member of the series while holding back the remaining ones.

31. The combination with mechanism for holding a series of detached thread-engaging loom elements, such as detached independent heddles, of means for positioning the same individually for the drawing-in operation, and means for holding said members in a compact series after the drawing-in operation.

32. The combination with mechanism for holding a series of detached, thread-engaging loom elements, such as detached independent heddles, of means for positioning said members individually for the drawing-in operation, and means for partly turning the same after the drawing-in operation.

33. The combination with mechanism for holding a series of detached, thread-engaging loom elements, such as detached independent heddles, of a thread-placing device, means for positioning said members individually with the flat side facing said thread-placing device, and means for turning said members with their edges alined with the thread-placing device after the drawing in operation.

34. A machine for controlling a series of detached independent thread-engaging loom elements such as heddles, comprising means for holding the members of said series, means for individually positioning the same for the drawing-in operation, and means for holding them in series formation after the drawing-in operation.

35. A machine for controlling detached independent thread-engaging loom elements such as heddles, comprising means for holding the said devices, means for positioning the same individually for the drawing-in operation, and means for holding said devices in a plurality of compact series after the drawing-in operation.

36. The combination with means for holding a series of detached independent thread-engaging loom elements such as heddles, in compact sequence, of means for positioning them individually for the drawing-in operation.

37. The combination with means for holding a series of detached, independent thread-engaging loom elements such as heddles, means for supporting a loom reed, means for positioning said heddles individually and means for placing a thread simultaneously through a reed dent and said positioned heddle.

38. The combination with means for holding plurality of detached independent thread-engaging loom elements such as heddles, of a threaded member adapted to engage said devices for positioning the same, and a thread-placing device adapted to operate for placing the thread through the positioned device.

39. The combination with means for holding a plurality of sets of detached thread-engaging loom elements, such as detached independent heddles, and means for positioning the individual members of said sets in predetermined order for the drawing-in of warp threads therethrough.

40. The combination with means for holding a plurality of detached thread-engaging loom elements, such as detached independent heddles, a thread-placing device, and means for automatically controlling and positioning the individual members with reference to the action of the thread-placing means.

41. In a warp-drawing machine the combination with a drawing-in needle, of a warp support, a loom reed support, means for holding a series of detached thread-engaging loom elements, such as detached independent heddles, means for automatically positioning the individual members of said series, and means for causing the drawing-in needle to draw the warp threads successively through the individual members of said series and the appropriate dents of the reed.

42. The combination with means for holding a series of thin, perforated, detached, independent metallic thread-engaging loom elements, such as heddles, of means for selecting and separating a single member from the series, and means for turning the same to place the perforation thereof in proper position for the drawing-in operation.

43. The combination with means for holding in compact series a plurality of detached, thread-engaging loom elements, such as detached independent heddles, means for separating the individual members of said series and means for pressing said series toward the said separating means.

44. The combination with means for holding a series of detached, thread-engaging loom elements, such as detached independent heddles, means for positioning the individual members thereof for the drawing-in operation, and means for pushing the individual members away from the path of the drawing-in device after the drawing-in operation.

45. The combination with a support upon which are loosely suspended a plurality of detached, thread-engaging loom elements, such as detached independent heddles, and means for selecting said members individually and move them along the said support to position the same for the drawing-in operation.

46. In a warp-drawing machine the combination with means for holding a series of detached thread-engaging loom elements, such as metallic heddles, in compact series, a traveling thread-placing device, and means to disengage the individual members of said series and present them individually within the path of said thread-placing device.

47. In a warp-drawing machine the combination with means for holding a plurality of detached independent thread-engaging loom elements such as heddles, said members being arranged in two sets, and intermittently operating means for selecting the members from each set.

48. The combination with means for holding a plurality of series of detached independent thread-engaging loom elements such as heddles, and means for selecting according to predetermined arrangement an individual member from a selected series and positioning the same with reference to the line of action of the thread-placing device.

49. A warp-drawing machine having means for supporting a warp, a thread-placing device, means for holding a plurality of detached members, such as independent heddles, drop bars, and devices for providing relative movement between said thread-placing means on the one hand and the warp supporting means and the holding means on the other.

50. In a machine for selecting and positioning detached thread-engaging loom elements such as metallic heddles, the combination with means for holding a series of said elements each by one end, a separating device adapted to engage and separate said elements singly and successively from the series, and a facing device acting upon the free end of each element.

51. A warp drawing-in machine comprising a magazine for independent drop-wires, means for causing the discharge of the drop-wires from the said magazine singly and successively, and means for holding each drop-wire after it is discharged for the reception of a warp thread.

52. In a machine for drawing warp-threads through the eyes or openings in detached heddles or similar devices for use in looms, a drawing-in device, a reservoir to hold the heddles in compact series, mechanism to select and separate them singly and successively from the series and deposit each with its eye in the path of reciprocation of the drawing-in device, and means to remove the heddles from such position and place them at right angles thereto in sequence with their respective eyes in linear coincidence.

53. In a warp-drawing machine containing a magazine for a series of detached metallic drop-bars, means to cause the discharge of the drop-bars singly and successively from the magazine, and means to hold each drop-bar, after it is discharged, for the reception of a warp-thread.

54. In a machine for handling detached members, such as heddles, drop bars or the like, the combination with a thread-placing device, of means bearing an unchanging relation to the thread-placing device as the thread-placing action progresses for holding a series of detached members, and means for presenting said members individually to the action of said thread-placing device.

55. A warp-drawing machine having means for supporting a warp, thread-placing means, means for causing relative traverse between the two, means bearing a fixed relation to the thread-placing means during such relative traverse for holding a plurality of detached members, such as independent heddles, drop bars or the like, means for presenting said members to the action of the thread-placing device, and means for turning a member so positioned after the drawing-in operation.

56. In a means for facing heddles, in combination, means for holding metallic heddles; means for separating one of said heddles from the body of heddles; and means for facing the eye portion of said selected heddle into a plane substantially at a right angle with those of the heddles in the body of heddles.

57. In a drawing-in machine, in combination, means for holding a body of heddles with their eyes facing in substantially parallel planes; means for separating one of said heddles from the body of heddles so held; means for facing the separated heddle; and means for putting a warp thread through the eye of the heddle so separated and faced.

58. In a drawing-in machine, in combination, an oscillatory heddle facer; means for moving a heddle into said facer; and means for inserting a warp thread into the faced heddle.

59. In a drawing-in machine, in combination, an oscillatory heddle facer; a rack and pinion for oscillating said facer; means for moving a heddle into said facer; and means for inserting a warp thread into the faced heddle.

60. In a drawing-in machine, in combination, an oscillatory heddle facer offset from its center of oscillation; means for moving a heddle into said facer; and means for inserting a warp thread into the faced heddle.

61. In a drawing-in machine, in combination, an oscillatory heddle facer; means for moving a heddle into said facer; means for inserting a warp thread into the faced heddle; and means for removing the heddle from said facer.

62. In a drawing-in machine, in combination, an oscillatory heddle facer; a rack and pinion for oscillating said facer; means for moving a heddle into said facer; means for inserting a warp thread into the faced heddle; and means for removing the heddle from said facer.

63. In a drawing-in machine, in combination, an oscillatory heddle facer offset from its center of oscillation; means for moving a heddle into said facer; means for inserting a warp thread into the faced heddle; and means for removing the heddle from said facer.

64. In a drawing-in machine, in combination, means for holding a body of heddles with their eye portions lying in substantially parallel planes; a heddle facer; means for placing a heddle in position to be operated upon by said facer; a reciprocatory needle for drawing a warp thread through a heddle eye; and means for presenting a warp thread to said needle.

65. Mechanism for operating upon flat metallic heddles or the like comprising means to compact said metallic heddles in a series with their flat faces in contact and means to eject heddles successively from said series.

66. Mechanism for operating upon independent heddles or the like comprising means to support a series of metallic heddles, means to eject the heddles singly and successively from said series, and means to position the ejected heddles successively for subsequent operation thereon.

67. Mechanism for operating upon warp threads or the like comprising heddle threading means, means to support independent heddles in series, means to move the leading heddle on the support and eject it from the series, and means to position the ejected heddle for the action of the heddle threading means.

68. Mechanism for operating upon metallic heddles or the like comprising means to engage and support such heddles in a compacted series, means to move said heddles while maintained in a series, and means to release individual heddles from said series.

69. Mechanism for operating upon metallic heddles or the like comprising means to suspend a series of such heddles, means engaging the foremost heddle to maintain said heddles compacted, and means to eject the leading heddle.

70. Mechanism for operating upon independent heddles or the like comprising a follower, means to compact the heddles in a series against said follower, and means to release the leading heddle from the series.

71. Mechanism for operating upon independent heddles or the like comprising means to suspend a series of heddles, a follower, means to compact the heddles against the follower, and means to eject the leading heddle.

72. Mechanism for operating upon independent heddles comprising a follower, a guide permitting movement of the follower, means to compact a series of heddles against said follower, and means to traverse said heddles and said follower.

73. Mechanism for operating upon independent heddles or the like comprising a follower, a guide whereon said follower is positioned for movement, means to compact a series of heddles against said follower, and means to release said heddles in succession from the series.

74. Mechanism for operating upon independent heddles or the like comprising a follower, a guide permitting movement of the follower, means to compact a series of heddles against said follower, means to advance said heddles and said follower, and means to release the leading heddle from the series.

75. Mechanism for operating upon independent heddles or the like comprising a heddle supporting member, supporting means therefor, a follower engaging said heddle supporting member for movement relative thereto, means to position a series of heddles upon said supporting member, and means to release the leading heddle.

76. A machine for operating upon independent heddles or the like having heddle turning means to receive a thin, flat, metallic heddle with its eye approximately at right angles to the direction of drawing-in movement and for turning it to position the eye in alinement with the drawing-in movement, and provision to hold the said heddle in that position until the warp thread is drawn through the eye.

77. In a machine for operating upon detached warp-thread-engaging elements, in combination, a magazine for said elements; means tending to move said elements out of said magazine; and an escapement controlling the outlet from said magazine.

78. In a drawing-in machine, in combination, an oscillatory heddle facer comprising two arms having between them a narrow space for the reception of a heddle; means for moving a heddle into said space; and means for inserting a warp thread into the faced heddle.

79. In a drawing-in machine, in combination, an oscillatory heddle facer comprising two arms having between them a narrow space for the reception of a heddle; means for moving a heddle into said space; means for inserting a warp thread into the faced heddle; and means for removing the heddle from said facer.

80. In a means for facing metallic heddles, in combination, means for holding a series of thin, flat, metallic heddles, means for turning the eye portion of one of said heddles, and means for placing said heddle in position to be acted upon by said turning means.

81. In a drawing-in machine, in combination, an oscillatory heddle facer adapted to engage and face a thin, flat, metallic heddle, means for moving one of said heddles into said facer, means for inserting a warp thread into the faced heddle, and means for removing said heddle from said facer.

82. In a machine for facing thin, flat, metallic heddles, the combination with a stringer bar on which a series of such heddles is adapted to be held in compacted series, of means for selecting one of said heddles and turning the eye portion thereof while the heddle is on said bar.

83. A warp drawing machine comprising means for supporting a warp and a reed; means for supporting a series of thin, flat, metallic heddles, the warp, reed and series of heddles extending in substantial parallelism; means for engaging a thread with a heddle eye and reed dent; and mechanisms for alining said engaging means and successive warp threads, heddle eyes and reed dents.

84. A warp drawing machine comprising means for supporting a warp and a reed; means for supporting a plurality of banks of thin, flat, metallic heddles, the warp, reed and banks of heddles extending in substantial parallelism; means for engaging a thread with a heddle eye and reed dent; and mechanisms for alining said engaging means, successive warp threads, heddle eyes and reed dents.

85. In a drawing-in machine in combination, means for supporting a series of detached metallic heddles, a heddle buncher, an oscillatory heddle facer, means to select and place a heddle in the facer, a heddle pusher for withdrawing heddles from the facer, a needle for drawing a warp thread through a heddle eye, and means for presenting warp threads to said needle.

86. In a heddle facing device in combination, means to support a series of metallic heddles, a facer offset in its center of oscillation, means to position a heddle from the series in the facer, and means for oscillating the facer.

87. In a heddle facing device in combination, means to support a series of metallic heddles, a facer comprising two arms having between them a narrow space for the reception of a heddle, means to position a heddle from the series between the arms and means for oscillating said facer.

88. In a heddle facing device in combination, means for supporting a series of metallic heddles, an oscillating shaft, two arms offset from the center of said shaft and having a space between them, means to position a heddle from the series between the arms, and means for oscillating said shaft.

89. In a means for facing heddles, the combination with means for holding flat, metallic heddles, of a heddle facer for facing one of said heddles, and means for placing a heddle in position to be acted upon by said facer.

90. In a means for facing heddles, the combination with means for holding flat, metallic heddles, a heddle facer having a turning movement about an axis for facing one of said heddles, and means for placing a heddle in position to be acted upon by said facer.

91. In means for facing flat, metallic heddles, the combination with means for holding a series of thin, flat, metallic heddles, of a heddle facer for facing said heddles, means for placing a heddle in position to be acted upon by said facer, and means for intermittently moving said facer to face a heddle.

92. In a warp drawing machine, the combination with means for selecting a warp thread, heddle holding means for holding a series of thin, flat, metallic heddles, means for putting the selected thread through the eye of a heddle, means automatically actuated for engaging one of said heddles, and taking it from said holding means, and means for presenting said taken heddle to said threading means.

93. The combination with means for holding a series of thin, flat, perforated, detached independent, thread engaging loom elements, such as heddles, of means for separating said members individually from the series, means for turning a separated member to place its perforation in proper position for the drawing-in operation, and means subsequently to position it in compacted series.

94. In a drawing-in machine, the combination with means for holding thin, flat, detached, metallic heddles, of means for putting a warp thread through the eye of a heddle, and means adapted to engage with and face one of said metallic heddles to receive said thread.

95. In a machine for facing metallic heddles, the combination with means for holding a series of thin, flat, metallic heddles of means for selecting and turning a heddle of said series to face a predetermined direction.

96. In a machine for threading metallic heddles, the combination with a reciprocatory drawing-in needle of means for holding a series of thin, flat, metallic heddles with their eyes at an angle to the line of action of the needle, and means for selecting and facing a heddle for the passage of said needle.

97. In a machine for threading metallic heddles, the combination with a reciprocatory drawing-in needle, of means for holding a plurality of thin, flat, metallic heddles in compacted series, and means for turning a heddle from said series and facing it to the drawing-in needle.

98. A warp-drawing machine comprising means for supporting a warp and a reed, one or more stringer bars for supporting each a series or bank of detached, flat, metallic perforated loom elements such as heddles, said bars, reed and warp extending in substantial parallelism; a reciprocatory needle, means for separating and turning said loom elements in succession to place each with its perforation in the path of the needle; and means to select and present successive warp threads and reed dents to the needle to cause said thread to be drawn simultaneously through the perforation of said selected element and through a reed dent.

99. In a machine for operating upon independent metallic heddles or the like, the combination with a fixed stringer bar for loosely assembling a series of such heddles with their flat faces in parallelism, means for crowding the heddles of the series compactly together on the bar, including a presser member adapted to exert a yielding pressure against one end of the series, a traveling carriage adapted to move across the series of heddles lengthwise the stringer bar, means on the carriage for selecting heddles singly and successively from the series, means also on the carriage for facing a selected heddle, thread-placing means also on the carriage to place a warp thread through the eye of a faced heddle, a supporting guideway also on said carriage for supporting and guiding the lower portions of the heddles, stop means on said carriage for engaging the opposite end of the compacted series of heddles for fixing it with relation to the selecting means, said means including both a stop on the support or guideway and means also engaging the upper portions of the heddles, whereby the foremost members of the compacted series of heddles are held pressed back on the stringer bar and operatively related to the advancing position of the selecting means on the traveling carriage.

100. In a machine for operating upon independent metallic heddles or the like, the combination with a stringer bar for loosely assembling a series of such heddles with their flat faces in parallelism, means for crowding the heddles of the series compactly together on the bar, means adapted to traverse the series of heddles for selecting the heddles singly and successively from the series, means movable with the selector for supporting the lower portions of the heddles, and stop means also movable with the selecting means for engaging the opposite end of the compacted series of heddles to fix it with relation to the selecting means whereby the foremost members of the compacted series of heddles are held pressed back on the stringer bar and operatively related to the advancing position of the selecting means on the traveling carriage.

101. In a machine for operating upon independent metallic heddles or the like, the combination with a stringer bar for loosely assembling a series of such heddles with their flat faces in parallelism, means for crowding the heddles of the series compactly together on the bar, means adapted to traverse the series of heddles for selecting the heddles singly and successively from the series, and stop means also movable with the selecting means for engaging the opposite end of the compacted series of heddles to fix it with relation to the selecting means whereby the foremost members of the compacted series of heddles are held pressed back on the stringer bar and operatively related to the advancing position of the selecting means on the traveling carriage.

102. In a machine for operating upon independent metallic heddles or the like, the combination with a plurality of parallel stringer bars for loosely assembling on each a series of such heddles with their flat faces in parallelism, means for crowding the heddles of each series compactly together on its bar, means adapted to traverse the heddles for selecting the latter singly and successively in predetermined order from the several series, and stop means also movable with the selecting means for engaging the opposite end of each compacted series of heddles to fix it with relation to the selecting means.

103. In a machine for operating upon independent heddles or the like, the combination with a stringer bar on which the heddles are loosely assembled with their flat faces in parallelism, selecting mechanism for selecting them singly and successively from the series, means to compact the series toward the selecting means, and stop or abutment means for the end of the series to give it a fixed relation to the selecting means.

104. In a machine for operating upon independent heddles or the like, the combination with a stringer bar on which the heddles are loosely assembled with their flat faces in parallelism, selecting mechanism for selecting them singly and successively from the series, compacting means for compacting the series toward the selecting means and comprising a presser member engaging the ends of the series with means for causing the presser member constantly to press against the heddles with a yielding pressure, and stop or abutment means for the opposite end of the series to give the same a fixed relation to the selecting means.

105. In mechanism for operating upon independent metallic heddles or the like, the combination with a stringer bar on which the heddles are loosely assembled, a traversing carriage, compacting means for crowding the heddles on the bar into a compacted series, supporting means on the carriage for supporting the lower portions of the compacted heddles, and selecting means also on said carriage for selecting the heddles singly and successively and withdrawing them from the compacted series and from said supporting means.

106. In a machine for operating upon independent metallic heddles, the combination with a stringer bar on which the heddles are adapted to be loosely held, means for compacting the heddles in a series, and an oscillatory finger adapted to hold back the forward end of the compacted series on the stringer bar but to be intermittently withdrawn therefrom to release the foremost heddle.

107. In a machine for operating upon independent metallic heddles, the combination with a stringer bar on which the heddles may be held in a compacted series, a member engaging the foremost heddle to hold back the compacted series, and means to turn said member about an axis to release the foremost heddle from the series.

108. In a machine for acting upon metallic heddles, the combination with means for holding a series of said heddles and magnetic means to separate said heddles singly and successively from the series.

109. In a machine for acting upon metallic heddles, the combination with means for holding a series of such heddles, a heddle positioning device and magnetic separating means to magnetically engage a heddle, separate it from the series and move it to a position to be acted upon by said positioning device.

110. In a machine for separating and selecting loom heddles, the combination with means for holding a series of said heddles and magnetic means for separating said heddles singly and successively from the series.

111. In a machine for acting upon metallic heddles, the combination with a stringer bar for holding a series of such heddles, facing means to turn a separated heddle and magnetic separating means to magnetically engage a heddle, separate it from the series, and move it to a position to be acted upon by said facing means.

112. In a machine for acting upon metallic heddles, the combination with means to hold a series of heddles, means to crowd them together in compacted arrangement, magnetic means to magnetically attract and separate a heddle from the series, and means to turn a heddle when separated.

113. In a machine for acting upon metallic heddles, the combination with means for holding a series of such heddles, a magnet, and means for moving said magnet to attract the foremost heddle of the series and separate it therefrom.

114. In a machine for acting upon metallic heddles, the combination with means for supporting said heddles in a plurality of banks and magnetic means to separate a heddle first from one bank and then from the other.

115. In a machine for acting upon metallic heddles, the combination with means for supporting said heddles in a plurality of banks, a magnet, and means for moving the same to attract and separate a heddle from one bank and then for moving the same to attract and separate a heddle from the other bank.

116. In a machine for acting upon flat metallic heddles, the combination with means for holding the same in series with their flat faces in contact, an arm, a magnet on the arm, means for swinging the arm to bring the magnet into proximity to the foremost one of the series to attract the same and for moving said magnet away to withdraw said heddle from the series.

117. In a machine for acting upon flat metallic heddles, the combination with means for holding the same in series with their flat faces in contact, an arm, a magnet on the arm, means for swinging the arm to bring the magnet into proximity to the foremost one of the series to attract the same and for moving said magnet away to withdraw said heddles from the series, and facing means to receive the withdrawn heddle.

118. In a machine for operating upon metallic heddles, the combination with means for holding said heddles in two banks, an arm, a magnet on the arm, means to swing the arm to attract the foremost heddle of one bank and to withdraw the said heddle and for then moving said arm to attract a heddle from the other bank and withdrawing the same, and means for engaging a withdrawn heddle to face the same.

119. In a machine for handling detached members, such as independent heddles, drop bars or the like, the combination with a thread-placing device, a warp support, means for traversing the thread-placing device across the warp support, and means adapted to travel with said carriage for holding a plurality of said detached members.

120. In a machine for drawing warp threads the combination with a thread-placing device, means for supporting the threads of a warp, means for causing relative traverse between the thread-placing device and the warp, means for holding a plurality of detached members, such as independent heddles, drop bars or the like, there being provided also relative movement between said heddle holding means and said warp, and means for presenting said detached members individually for the action of the thread-placing device.

In testimony whereof I have signed my name to this specification, in the presence of two subscribing witnesses, this 10th day of May, A. D. 1898.

MILLARD F. FIELD.

Witnesses:
ARTHUR W. CROSSLEY,
C. D. LANNING.